US009826748B2

(12) United States Patent
Hazenbroek et al.

(10) Patent No.: US 9,826,748 B2
(45) Date of Patent: Nov. 28, 2017

(54) METHOD OF DEBONING ANIMAL THIGHS FOR SEPARATING AND COLLECTING MEAT THEREFROM AND APPARATUS FOR PERFORMING THE METHOD

(71) Applicant: Foodmate BV, Oud-Beijerland (NL)

(72) Inventors: Jacobus Eliza Hazenbroek, Oud-Beijerland (NL); Dirk Cornelis Stooker, Puttershoek (NL); Gerrit Hendrik Woltman, Goudswaard (NL)

(73) Assignee: Foodmate BV (NL)

( * ) Notice: Subject to any disclaimer, the term of this patent is extended or adjusted under 35 U.S.C. 154(b) by 0 days.

(21) Appl. No.: 14/509,826

(22) Filed: Oct. 8, 2014

(65) Prior Publication Data
US 2015/0024665 A1    Jan. 22, 2015

Related U.S. Application Data

(62) Division of application No. 13/014,091, filed on Jan. 26, 2011, now Pat. No. 8,882,571.

(51) Int. Cl.
*A22C 17/00* (2006.01)
*A22C 17/02* (2006.01)
(Continued)

(52) U.S. Cl.
CPC ........ *A22C 21/0076* (2013.01); *A22B 5/0017* (2013.01); *A22B 5/0035* (2013.01);
(Continued)

(58) Field of Classification Search
CPC ... A22B 5/0017; A22B 5/0035; A22C 17/004; A22C 21/0069; A22C 21/0076
(Continued)

(56) References Cited

U.S. PATENT DOCUMENTS 3,261,054 A    7/1966   Kaplan et al.
3,348,261 A *  10/1967  Segur .................... A22C 17/04
                                                452/136
(Continued)

FOREIGN PATENT DOCUMENTS

EP    0 439 784        12/1990
EP    0 736 255 A1     10/1996
(Continued)

OTHER PUBLICATIONS

EP Office Action dated May 26, 2014 in EP 12 703 612.7-1655.
(Continued)

*Primary Examiner* — David Parsley
(74) *Attorney, Agent, or Firm* — Womble Carlyle Sandridge & Rice LLP

(57) ABSTRACT

A method is disclosed for mechanically deboning animal thighs for separating and collecting meat therefrom and an apparatus for performing the method, including automated individual processing steps. The processing steps include: grasping a thigh bone of an animal thigh at a hip knuckle with a bone holder; cutting tissue near the hip knuckle; and engaging the thigh bone adjacent the bone holder with a meat stripper. The processing steps further include: moving the bone holder and meat stripper away from one another in a direction substantially coextensive with the longitudinal extent of the thigh bone; allowing the meat stripper to pass over the knee knuckle; and collecting the meat separated from the bone. In particular the method includes and the apparatus performs the process step of cutting tissue adjacent a knee knuckle of the thigh bone, prior to allowing the meat stripper to pass over the knee knuckle. The apparatus includes a plurality of processing stations for carrying out the individual steps, and the processing stations are arranged
(Continued)

along a path of conveyance defined by a conveyor chain moving through a predefined path.

23 Claims, 13 Drawing Sheets

(51) Int. Cl.
  *A22C 21/00* (2006.01)
  *A22B 5/00* (2006.01)
(52) U.S. Cl.
  CPC ............ *A22C 17/004* (2013.01); *A22C 17/02* (2013.01); *A22C 21/0069* (2013.01)
(58) Field of Classification Search
  USPC ........................................ 452/135, 136, 138
  See application file for complete search history.

(56) References Cited

U.S. PATENT DOCUMENTS

| | | |
|---|---|---|
| 3,593,368 A | 7/1971 | Cox |
| 3,672,000 A | 6/1972 | Martin et al. |
| 3,956,794 A | 5/1976 | Verbakel |
| 3,969,790 A | 7/1976 | Smorenburg |
| 3,979,793 A | 9/1976 | Hazenbroek |
| 3,983,601 A | 10/1976 | Verbakel |
| 3,990,128 A | 11/1976 | van Mil |
| 4,011,573 A | 3/1977 | Braico |
| 4,034,440 A | 7/1977 | van Mil |
| 4,041,572 A | 8/1977 | Martin et al. |
| 4,096,950 A | 6/1978 | Brook |
| 4,118,829 A | 10/1978 | Harben, Jr. |
| 4,131,973 A | 1/1979 | Verbakel |
| 4,147,012 A | 4/1979 | van Mil |
| 4,153,971 A | 5/1979 | Simonds |
| 4,153,972 A | 5/1979 | Harben et al. |
| 4,178,659 A | 12/1979 | Simonds |
| 4,203,178 A | 5/1980 | Hazenbroek |
| 4,283,813 A | 8/1981 | House |
| 4,292,709 A | 10/1981 | van Mil |
| 4,388,811 A | 6/1983 | Zebarth |
| 4,395,795 A | 8/1983 | Hazenbroek |
| 4,406,037 A | 9/1983 | Hazenbroek |
| 4,418,444 A | 12/1983 | Meyn et al. |
| 4,418,445 A | 12/1983 | Meyn et al. |
| 4,434,526 A | 3/1984 | van Mil |
| 4,439,891 A | 4/1984 | van Mil |
| 4,468,838 A | 9/1984 | Sjöström et al. |
| 4,510,886 A | 4/1985 | van Mil |
| 4,514,879 A | 5/1985 | Hazenbroek |
| 4,516,290 A | 5/1985 | van Mil |
| 4,524,489 A | 6/1985 | van Mil |
| 4,558,490 A | 12/1985 | Hazenbroek et al. |
| 4,559,672 A | 12/1985 | Hazenbroek et al. |
| 4,567,624 A | 2/1986 | van Mil |
| 4,570,295 A | 2/1986 | van Mil |
| 4,574,429 A | 3/1986 | Hazenbroek |
| 4,577,368 A | 3/1986 | Hazenbroek |
| D283,289 S | 4/1986 | Hazenbroek |
| 4,593,432 A | 6/1986 | Hazenbroek |
| 4,597,133 A | 7/1986 | van de Nieuwelaar |
| 4,597,136 A | 7/1986 | Hazenbroek |
| 4,635,317 A | 1/1987 | van der Eerden |
| 4,639,973 A | 2/1987 | van der Eerden |
| 4,639,974 A | 2/1987 | Olson |
| 4,639,975 A | 2/1987 | van der Eerden |
| 4,646,384 A | 3/1987 | van der Eerden |
| 4,651,383 A | 3/1987 | van der Eerden |
| 4,653,147 A | 3/1987 | van der Eerden |
| 4,682,386 A | 7/1987 | Hazenbroek et al. |
| 4,704,768 A | 11/1987 | Hutting et al. |
| 4,723,339 A | 2/1988 | van den Nieuwelaar et al. |
| 4,724,581 A | 2/1988 | van den Nieuwelaar |
| 4,736,492 A | 4/1988 | Hazenbroek |
| RE32,697 E | 6/1988 | Hazenbroek et al. |
| 4,765,028 A | 8/1988 | van den Nieuwelaar et al. |
| 4,766,644 A | 8/1988 | van den Nieuwelaar et al. |
| 4,769,872 A | 9/1988 | Hazenbroek et al. |
| 4,779,308 A | 10/1988 | van den Nieuwelaar et al. |
| 4,788,749 A | 12/1988 | Hazenbroek et al. |
| 4,811,456 A | 3/1989 | Heuvel |
| 4,811,458 A | 3/1989 | Nieuwelaar et al. |
| 4,811,462 A | 3/1989 | Meyn |
| 4,813,101 A | 3/1989 | Brakels et al. |
| 4,856,144 A | 8/1989 | De Greef |
| 4,884,318 A | 12/1989 | Hazenbroek |
| 4,893,378 A | 1/1990 | Hazenbroek |
| 4,894,885 A | 1/1990 | Markert |
| 4,896,399 A | 1/1990 | Hazenbroek |
| 4,899,421 A | 2/1990 | Van Der Eerden |
| 4,918,787 A | 4/1990 | Hazenbroek |
| 4,928,351 A | 5/1990 | van den Nieuwelaar et al. |
| 4,935,990 A | 6/1990 | Linnenbank |
| 4,939,813 A | 7/1990 | Hazenbroek |
| 4,958,694 A | 9/1990 | van den Nieuwelaar et al. |
| 4,965,908 A | 10/1990 | Meyn |
| 4,972,549 A | 11/1990 | van den Nieuwelaar et al. |
| 4,993,113 A | 2/1991 | Hazenbroek |
| 4,993,115 A | 2/1991 | Hazenbroek |
| 5,001,812 A | 3/1991 | Hazenbroek |
| 5,013,431 A | 5/1991 | Doets |
| 5,015,213 A | 5/1991 | Hazenbroek |
| 5,019,013 A | 5/1991 | Hazenbroek |
| 5,026,983 A | 6/1991 | Meyn |
| 5,035,673 A | 7/1991 | Hazenbroek |
| 5,037,351 A | 8/1991 | van den Nieuwelaar et al. |
| 5,041,054 A | 8/1991 | van den Nieuwelaar et al. |
| 5,045,022 A | 9/1991 | Hazenbroek |
| 5,060,596 A | 10/1991 | Esbroeck |
| 5,064,402 A | 11/1991 | Koops |
| 5,067,927 A | 11/1991 | Hazenbroek et al. |
| 5,069,652 A | 12/1991 | Hazenbroek |
| 5,074,823 A | 12/1991 | Meyn |
| 5,088,959 A | 2/1992 | Heemskerk |
| 5,090,940 A | 2/1992 | Adkison |
| 5,098,333 A | 3/1992 | Cobb |
| 5,104,351 A | 4/1992 | van den Nieuwelaar et al. |
| 5,122,090 A | 6/1992 | van den Nieuwelaar et al. |
| 5,123,871 A | 6/1992 | van den Nieuwelaar et al. |
| 5,125,498 A | 6/1992 | Meyn |
| 5,147,240 A | 9/1992 | Hazenbroek et al. |
| 5,147,241 A | 9/1992 | Rudin |
| 5,154,664 A | 10/1992 | Hazenbroek et al. |
| 5,154,665 A | 10/1992 | Hazenbroek |
| RE34,149 E | 12/1992 | Markert |
| 5,173,076 A | 12/1992 | Hazenbroek |
| 5,173,077 A | 12/1992 | van den Nieuwelaar et al. |
| 5,176,563 A | 1/1993 | van den Nieuwelaar et al. |
| 5,176,564 A | 1/1993 | Hazenbroek |
| 5,178,890 A | 1/1993 | van den Nieuwelaar et al. |
| 5,186,679 A | 2/1993 | Meyn |
| 5,188,559 A | 2/1993 | Hazenbroek |
| 5,188,560 A | 2/1993 | Hazenbroek |
| 5,194,035 A | 3/1993 | Dillard |
| 5,197,917 A | 3/1993 | Verbakel et al. |
| 5,199,922 A | 4/1993 | Korenberg et al. |
| 5,203,736 A * | 4/1993 | Schulte .............. A22C 21/0076 452/127 |
| 5,222,905 A | 6/1993 | Van den Nieuwelaar et al. |
| 5,242,324 A | 9/1993 | Koops |
| 5,248,277 A | 9/1993 | Bos et al. |
| 5,256,101 A | 10/1993 | Koops |
| 5,269,721 A | 12/1993 | Meyn |
| 5,277,649 A | 1/1994 | Adkison |
| 5,277,650 A | 1/1994 | Meyn |
| 5,279,517 A | 1/1994 | Koops |
| 5,290,187 A | 3/1994 | Meyn |
| 5,299,975 A | 4/1994 | Meyn |
| 5,299,976 A | 4/1994 | Meyn |
| 5,318,428 A | 6/1994 | Meyn |
| 5,326,311 A | 7/1994 | Persoon et al. |
| 5,334,083 A | 8/1994 | van den Nieuwelaar et al. |
| 5,336,127 A | 8/1994 | Hazenbroek |

(56) References Cited

U.S. PATENT DOCUMENTS

| | | |
|---|---|---|
| 5,340,351 A | 8/1994 | Minderman et al. |
| 5,340,355 A | 8/1994 | Meyn |
| 5,342,237 A | 8/1994 | Kolkman |
| 5,344,359 A | 9/1994 | Kolkman |
| 5,344,360 A | 9/1994 | Hazenbroek |
| 5,366,406 A | 11/1994 | Hobbel et al. |
| 5,370,574 A | 12/1994 | Meyn |
| 5,372,246 A | 12/1994 | van Aalst |
| RE34,882 E | 3/1995 | Meyn |
| 5,429,549 A | 7/1995 | Verrijp et al. |
| 5,439,702 A | 8/1995 | French |
| 5,453,045 A | 9/1995 | Hobbel et al. |
| 5,462,477 A | 10/1995 | Ketels |
| 5,470,194 A | 11/1995 | Zegers |
| 5,487,700 A | 1/1996 | Dillard |
| 5,490,451 A | 2/1996 | Nersesian |
| 5,505,657 A | 4/1996 | Janssen et al. |
| 5,549,521 A | 8/1996 | van den Nieuwelaar et al. |
| D373,883 S | 9/1996 | Dillard |
| 5,569,067 A | 10/1996 | Meyn |
| 5,595,066 A | 1/1997 | Zwanikken et al. |
| 5,605,503 A | 2/1997 | Martin |
| 5,643,072 A | 7/1997 | Lankhaar et al. |
| 5,643,074 A | 7/1997 | Linnenbank |
| 5,672,098 A | 9/1997 | Veraart |
| 5,676,594 A | 10/1997 | Joosten |
| 5,704,830 A | 1/1998 | Van Ochten |
| 5,713,786 A | 2/1998 | Kikstra |
| 5,713,787 A | 2/1998 | Schoenmakers et al. |
| 5,741,176 A | 4/1998 | Lapp et al. |
| 5,755,617 A | 5/1998 | van Harskamp et al. |
| 5,759,095 A | 6/1998 | De Weerd |
| 5,766,063 A | 6/1998 | Hazenbroek et al. |
| 5,782,685 A | 7/1998 | Hazenbroek et al. |
| 5,785,588 A | 7/1998 | Jacobs et al. |
| 5,803,802 A | 9/1998 | Jansen |
| 5,810,651 A | 9/1998 | De Heer et al. |
| 5,810,653 A | 9/1998 | Van Craaikamp et al. |
| 5,813,908 A | 9/1998 | Craaikamp |
| 5,827,116 A | 10/1998 | Al et al. |
| 5,833,527 A | 11/1998 | Hazenbroek et al. |
| 5,865,672 A | 2/1999 | Hazenbroek |
| 5,875,738 A | 3/1999 | Hazenbroek et al. |
| 5,947,811 A | 9/1999 | Hazenbroek et al. |
| 5,951,393 A | 9/1999 | Barendregt |
| 5,975,029 A | 11/1999 | Morimoto et al. |
| 5,976,004 A | 11/1999 | Hazenbroek |
| 5,980,377 A | 11/1999 | Zwanikken et al. |
| 6,007,416 A | 12/1999 | Janssen et al. |
| 6,007,417 A | 12/1999 | Jones et al. |
| 6,024,636 A | 2/2000 | Hazenbroek et al. |
| 6,027,403 A | 2/2000 | Hazenbroek et al. |
| 6,027,404 A | 2/2000 | Wols |
| 6,029,795 A | 2/2000 | Janssen et al. |
| 6,033,299 A | 3/2000 | Stone et al. |
| 6,062,972 A | 5/2000 | Visser |
| 6,095,914 A | 8/2000 | Cornelissen et al. |
| 6,126,534 A | 10/2000 | Jacobs et al. |
| 6,132,304 A | 10/2000 | Aarts et al. |
| 6,142,863 A | 11/2000 | Janssen et al. |
| 6,152,816 A | 11/2000 | van den Nieuwelaar et al. |
| 6,176,772 B1 | 1/2001 | Hazenbroek et al. |
| 6,179,702 B1 | 1/2001 | Hazenbroek |
| 6,190,250 B1 | 2/2001 | Volk et al. |
| 6,193,595 B1 | 2/2001 | Volk et al. |
| 6,220,953 B1 | 4/2001 | Cornelissen et al. |
| 6,231,436 B1 | 5/2001 | Bakker |
| 6,254,471 B1 | 7/2001 | Meyn |
| 6,254,472 B1 | 7/2001 | Meyn |
| 6,277,021 B1 | 8/2001 | Meyn |
| 6,299,524 B1 | 10/2001 | Janssen et al. |
| 6,306,026 B1 | 10/2001 | Post |
| 6,322,438 B1 | 11/2001 | Barendregt |
| 6,358,136 B1 | 3/2002 | Volk et al. |
| 6,371,843 B1 | 4/2002 | Volk et al. |
| 6,375,560 B1 | 4/2002 | Verrijp |
| 6,383,069 B1 | 5/2002 | Volk et al. |
| 6,398,636 B1 | 6/2002 | Jansen et al. |
| 6,446,352 B2 | 9/2002 | Middelkoop et al. |
| 6,478,668 B2 | 11/2002 | Visser et al. |
| 6,530,466 B2 | 3/2003 | Murata et al. |
| 6,599,179 B1 | 7/2003 | Hazenbroek et al. |
| 6,612,919 B2 | 9/2003 | Jansen et al. |
| 6,656,032 B2 | 12/2003 | Hazenbroek et al. |
| 6,726,556 B2 | 4/2004 | Gooren et al. |
| 6,736,717 B1 | 5/2004 | Annema et al. |
| 6,764,393 B1 | 7/2004 | Hazenbroek et al. |
| 6,783,451 B2 | 8/2004 | Aandewiel et al. |
| 6,811,478 B2 | 11/2004 | van den Nieuwelaar et al. |
| 6,811,480 B2 | 11/2004 | Moriarty |
| 6,811,802 B2 | 11/2004 | van Esbroeck et al. |
| 6,830,508 B2 | 12/2004 | Hazenbroek et al. |
| 6,837,782 B2 | 1/2005 | Hetterscheid et al. |
| 6,899,613 B2 | 5/2005 | van den Nieuwelaar et al. |
| 6,912,434 B2 | 6/2005 | van den Nieuwelaar et al. |
| 6,986,707 B2 | 1/2006 | van den Nieuwelaar et al. |
| 7,018,283 B2 | 3/2006 | Schmidt et al. |
| 7,029,387 B2 | 4/2006 | van den Nieuwelaar et al. |
| 7,059,954 B2 | 6/2006 | Annema et al. |
| 7,063,611 B2 | 6/2006 | Nolten et al. |
| 7,066,806 B2 | 6/2006 | de Heer et al. |
| 7,070,493 B2 | 7/2006 | Hazenbroek et al. |
| 7,115,030 B2 | 10/2006 | van Hillo et al. |
| 7,125,330 B2 | 10/2006 | Beeksma et al. |
| 7,128,937 B2 | 10/2006 | van den Nieuwelaar et al. |
| 7,133,742 B2 | 11/2006 | Cruysen et al. |
| 7,172,781 B2 | 2/2007 | Kish |
| 7,195,554 B2 | 3/2007 | Hayakawa et al. |
| 7,232,365 B2 | 6/2007 | Annema et al. |
| 7,232,366 B2 | 6/2007 | van den Nieuwelaar et al. |
| 7,249,998 B2 | 7/2007 | van Esbroeck et al. |
| 7,261,629 B2 | 8/2007 | Holleman |
| 7,284,973 B2 | 10/2007 | van Esbroeck et al. |
| 7,302,885 B2 | 12/2007 | Townsend |
| 7,344,436 B2 | 3/2008 | Hayakawa et al. |
| 7,344,437 B2 | 3/2008 | Van den Nieuwelaar et al. |
| D565,941 S | 4/2008 | Peters et al. |
| 7,357,707 B2 | 4/2008 | de Vos et al. |
| 7,476,148 B2 | 1/2009 | McQuillan et al. |
| 7,479,059 B2 * | 1/2009 | Seesing .............. A22C 21/0038 452/135 |
| 7,494,406 B2 | 2/2009 | van Esbroeck et al. |
| 7,530,888 B2 | 5/2009 | Annema et al. |
| 7,572,176 B2 | 8/2009 | Petersen et al. |
| 7,662,033 B1 | 2/2010 | Ritter et al. |
| 7,662,034 B2 | 2/2010 | Van Hillo et al. |
| 7,717,773 B2 | 5/2010 | Woodford et al. |
| 7,740,527 B1 | 6/2010 | Harben |
| 7,744,449 B2 | 6/2010 | van Esbroeck et al. |
| 7,824,251 B2 | 11/2010 | van den Nieuwelaar et al. |
| 2001/0023171 A1 | 9/2001 | Hazenbroek et al. |
| 2002/0055328 A1 | 5/2002 | Schmidt et al. |
| 2002/0058470 A1 | 5/2002 | Schmidt et al. |
| 2002/0090905 A1 | 7/2002 | Moriarty |
| 2002/0168930 A1 | 11/2002 | Jansen et al. |
| 2003/0008606 A1 | 1/2003 | Hazenbroek et al. |
| 2003/0084856 A1 | 5/2003 | Hazenbroek et al. |
| 2003/0092372 A1 | 5/2003 | Aandewiel et al. |
| 2004/0198209 A1 | 10/2004 | Hazenbroek et al. |
| 2004/0235409 A1 | 11/2004 | Nolten et al. |
| 2005/0037704 A1 | 2/2005 | Heer et al. |
| 2005/0037705 A1 | 2/2005 | Beeksma et al. |
| 2005/0048894 A1 | 3/2005 | van Hillo et al. |
| 2005/0186897 A1 | 8/2005 | Holleman |
| 2005/0221748 A1 | 10/2005 | Hillo et al. |
| 2006/0099899 A1 | 5/2006 | Hazenbroek et al. |
| 2006/0217051 A1 | 9/2006 | Gerrits |
| 2007/0082595 A1 | 4/2007 | de Vos et al. |
| 2007/0221071 A1 | 9/2007 | Kuijpers et al. |
| 2007/0224306 A1 | 9/2007 | van Esbroeck et al. |
| 2008/0017050 A1 | 1/2008 | van Esbroeck et al. |
| 2008/0125025 A1 | 5/2008 | Van Den Nieuwelaar et al. |
| 2008/0171506 A1 | 7/2008 | Nieuwelaar et al. |
| 2009/0239457 A1 | 9/2009 | Jansen et al. |

(56) References Cited

U.S. PATENT DOCUMENTS

| | | |
|---|---|---|
| 2009/0320761 A1 | 12/2009 | Grave et al. |
| 2010/0022176 A1 | 1/2010 | Van Den Nieuwelaar et al. |
| 2010/0029186 A1 | 2/2010 | Janssen et al. |
| 2010/0048114 A1 | 2/2010 | Van Den Nieuwelaar et al. |
| 2010/0062699 A1 | 3/2010 | Sorensen et al. |
| 2010/0075584 A1 | 3/2010 | Aandewiel et al. |
| 2010/0081366 A1 | 4/2010 | De Vos et al. |
| 2010/0120344 A1 | 5/2010 | Van Den Nieuwelaar et al. |
| 2010/0151779 A1 | 6/2010 | Bakker |
| 2010/0221991 A1 | 9/2010 | Hagendoorn |

FOREIGN PATENT DOCUMENTS

| | | |
|---|---|---|
| EP | 0 786 208 A1 | 7/1997 |
| EP | 0 858 739 A2 | 8/1998 |
| EP | 1 353 155 A1 | 10/2003 |
| EP | 1 440 618 | 7/2004 |
| EP | 1 538 113 A1 | 6/2005 |
| EP | 1 639 898 A | 3/2006 |
| EP | 2 181 841 A1 | 5/2010 |
| FR | 2 529 177 A1 | 12/1983 |
| GB | 1 395 722 A | 5/1975 |
| WO | WO 02/44670 A1 | 6/2002 |
| WO | WO 03-039262 | 5/2003 |
| WO | WO 2007-055571 | 5/2007 |
| WO | WO 2012-102609 | 8/2012 |

OTHER PUBLICATIONS

Search Report in Netherlands Application No. 2006075 dated Jan. 12, 2011.
Office Action in EP Application No. 12 703 612.7 dated May 26, 2014.
European Search Report for European Application No. 14 19 8109 dated Mar. 30, 2015.
Search Report and Written Opinion dated Jan. 3, 2011 for NL 2004574.
International Preliminary Report on Patentability for PCT/NL2011/050267 dated Nov. 1, 2012.

* cited by examiner

METHOD OF DEBONING ANIMAL THIGHS FOR SEPARATING AND COLLECTING MEAT THEREFROM AND APPARATUS FOR PERFORMING THE METHOD

REFERENCE TO RELATED APPLICATION

This is a division of U.S. patent application Ser. No. 13/014,091 filed on 26 Jan. 2011 and entitled Method of Deboning Animal Thighs for Separating and Collecting Meat Therefrom and Apparatus for Performing the Method.

TECHNICAL FIELD

The invention relates generally to food processing and more particularly to a method and apparatus for mechanically removing meat from the encased thigh bones of animals such as poultry or fowl.

BACKGROUND

The ability to obtain large quantities of thigh meat from slaughtered animals, such as poultry or fowl, by mechanical means is of great importance to world food, production. It is not uncommon in the food industry, for instance, that well over a hundred thousand slaughtered birds are processed in one day's shift at a poultry processing plant.

Various methods and apparatuses have been developed for removing thigh meat from thigh bones or femurs of poultry and fowl as thighs are moved along a processing path or cut-up line. Generally, cut-up lines for bird carcasses can operate at high capacity, and suspend the carcasses by their ankle joints from shackles. As a result, the legs and thighs are commonly amongst the last items to be processed. This manner of suspension and order of processing is not always ideal in getting the best yield of meat and in preventing contamination of recovered meat by bone fragments. It has therefore become increasingly popular to process thigh meat separately from the traditional cut-up lines, at the disadvantage of having to collect the yet unprocessed thighs and convey and feed these one by one to a dedicated processing device. Part of this drawback has been overcome in that one or a plurality of such thigh processing devices can be operated simultaneous with an associated a cut-up line. Such dedicated thigh deboning devices, as disclosed for example in U.S. Pat. No. 3,510,908, often rely on manual labour, can be cumbersome to operate, and do little if anything to increase processing speed.

Accordingly, there is a need for an improved method and apparatus for deboning animal thighs for separating and collecting meat from the thigh bone. In a more general sense there is a need to overcome or ameliorate at least one of the disadvantages of the prior art. There is an overall need to provide alternative structures that are less cumbersome in assembly and operation and that moreover can be made relatively inexpensively. Alternatively a need exists at least to provide the public with a useful choice. It is to the provision of a method and apparatus that meets these and other needs that the present disclosure is primarily directed.

SUMMARY

Briefly described, a method of deboning animal thighs is disclosed for separating and collecting meat from thigh bones and an apparatus is disclosed for performing the method. The method in one embodiment includes or comprises grasping a thigh bone of an animal thigh at a hip knuckle with a bone holder; cutting tissue near the hip knuckle; and engaging the thigh bone adjacent the bone holder with a meat stripper. The method further includes moving the bone holder and meat stripper away from one another in a direction substantially coextensive with the longitudinal extent of the thigh bone; allowing the meat stripper to pass over the knee knuckle; and collecting the meat separated from the bone. The method may further include, and the apparatus may perform the process step of, cutting tissue adjacent a knee knuckle of the thigh bone prior to allowing the meat stripper to pass over the knee knuckle.

The apparatus includes or comprises a plurality of processing stations for carrying out the individual steps of the method, and the processing stations are arranged along a path of conveyance defined by a conveyor chain moving through a predefined path. The method and apparatus, in one embodiment, enables the animal thighs to be hung from their hip knuckles, rather than suspending the entire leg from an ankle knuckle or the thigh from its knee knuckle as has been common in the past. It has been found that stripping the meat from a thigh bone gives the best yield when stripping from the hip knuckle in the direction of the knee knuckle. Also, the cutting of knee knuckle related tissue prior to stripping the meat off the bone improves the yield and the quality of the meat. Further, with the method of this disclosure, the sleeve of meat is not turned inside-out when it slides past the last knuckle to which it is still attached before it is cut lose, as is the case with the prior art methods and apparatuses.

The aspects as covered by the appended claims as well as other aspects, features and advantages of the invention will be explained further in the detailed description presented below in conjunction with the accompanying drawing figures, which are briefly described as follows.

DETAILED DESCRIPTION OF EXEMPLARY EMBODIMENTS

Figure 1:
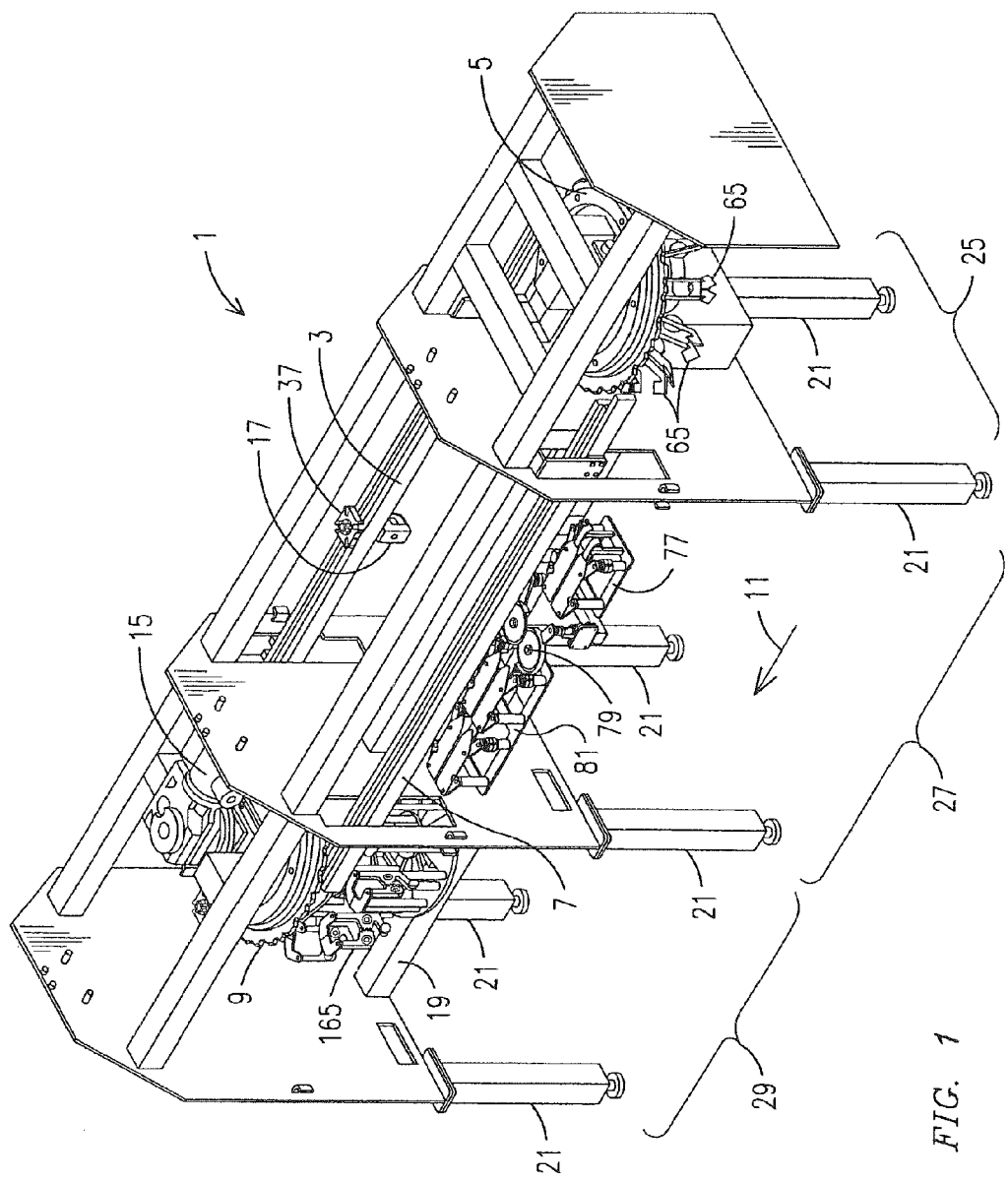
FIG. 1 is a bird's eye perspective view of an apparatus according for performing the method of the invention that embodies principles of the invention in one preferred form.
Figure 2:
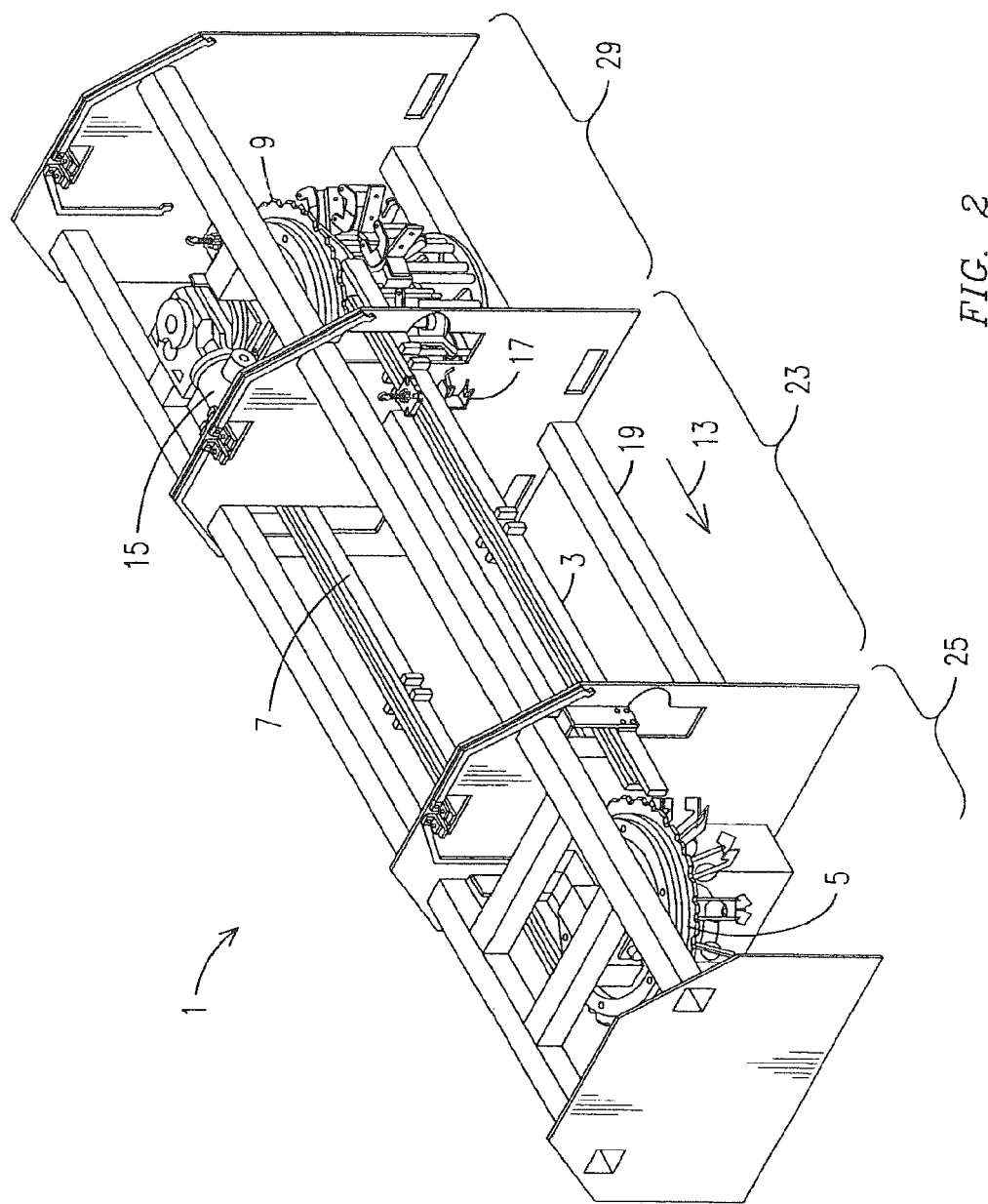
FIG. 2 is a bird's eye perspective view of the apparatus of FIG. 1 from a second perspective.

Reference will now be made in detail to the drawing figures, wherein like reference numerals may indicate like parts throughout the several views. In FIGS. 1 and 2, bird's eye perspective views are shown of opposite sides of one embodiment of an apparatus 1 for performing the method of the invention. The apparatus 1 has an overhead conveyor that is defined by a first linear conveyor section 3, a first carousel 5, a second linear conveyor section 7, and a second carousel 9. The overhead conveyor includes a conveyor chain (not shown but conventional) that is arranged for movement in the direction of arrows 11 (FIG. 1) and 13 (FIG. 2). The conveyor chain is driven for movement by the second carousel 9, which is provided for this purpose with an electric drive motor 15 that may drive the carousel 9 through a gear reduction transmission. The first carousel 5 is mounted for idle rotation and is driven indirectly by the conveyor chain, as is conventional for such overhead conveying systems for moving article hangers, such as bone holder 17, through and along a processing path. All the basic elements described thus far are mounted on and supported by a frame, generally indicated with reference numeral 19, which can be supported by legs 21 (only shown in FIG. 1) to be at a convenient height. In the direction of movement of the conveyor, the apparatus 1, in accordance with the direction of movement of arrows 11 and 13, can be distinguished by or can define a loading section 23 (FIG. 2), a first tissue cutting section 25, a second tissue cutting section 27 and a meat stripping and discharge section 29.

As seen in FIG. 2, at the loading section 23, the bone holder 17 (only one of which is shown for clarity) is presented with a bifurcated receiving end opening to the exterior of the apparatus 1 and exposed to a worker at the loading station. The bone holder 17 is illustrated in more detail in FIGS. 3 and 4, to which reference is made for a more detailed description of the bone holder. While only one bone holder 17 is shown in FIGS. 1 and 2, for clarity, it is to be understood that a plurality of such bone holders are present and spaced at regular intervals along the overhead conveyor. Such arrangements of items along the conveyor chain are conventional and require no further explanation.

Figure 3:
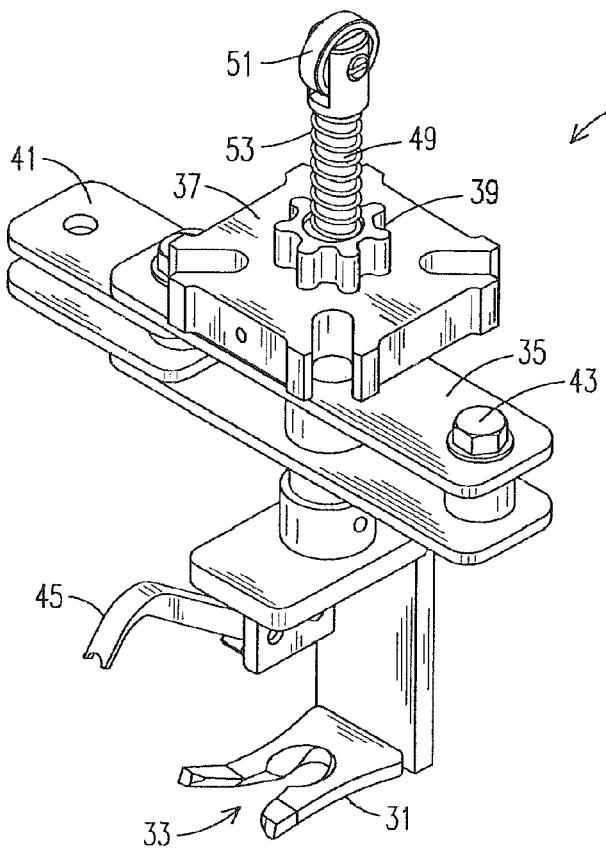
FIG. 3 is a perspective view of a bone holder for use with the apparatus of this disclosure.

The bone holder 17, shown in more detail in FIG. 3, comprises a bifurcated receiving end 31, which defines a receiving slot 33 for receiving and supporting the hip knuckle (caput femoris) of a thigh bone (femur), with the knee knuckle (condylus) hanging substantially vertically downwardly below the receiving slot 33. The receiving end 31 of the bone holder 17 is rotatably received in a bone holder shackle 35 by a hollow central shaft, which is connected for rotation by a turning gear 37. Also connected to the hollow central shaft for rotation of the receiving end 31 is a gear pinion 39. Thus, rotation of the turning gear 37 or of the gear pinion 36 causes corresponding rotation of the receiving end 31 about a substantially vertical axis.

Figure 4:
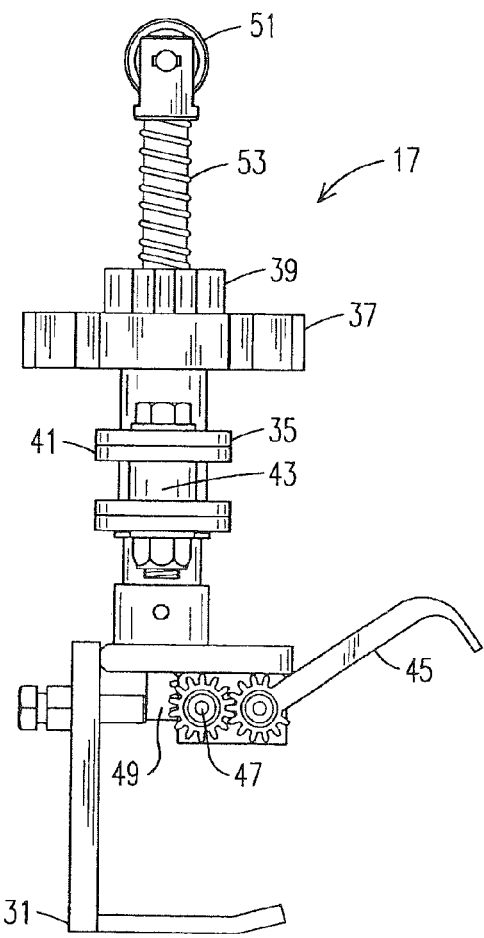
FIG. 4 is a side elevation of the bone holder of FIG. 3.

An intermediate shackle 41 is pivotally connected to one end of the shackle 35 and projects therefrom. The intermediate shackle is configured to be pivotally connected to the bolt 43 of a successive like bone holder 17 such that plurality of interconnected shackles and intermediate shackles form the conveyer chain. The bone holder also comprises a swivelable or pivotable locking arm 45. This swivelable locking arm 45 is mounted for swivelling or pivotal movement from an open position, as shown in FIGS. 3 and 4, to a locking position, in which it engages in the receiving slot 33 to prevent a thigh bone suspended in the receiving slot 33 from escaping. Swivelling of the locking arm 45 is effected through an intermediate pinion 47 (FIG. 4), which is driven by a toothed rack or pusher rod 49 that extends through the hollow central shaft of the bone holder 17. Pusher rod 49 at its upper end carries a cam follower 51, which in use is positioned to be engaged by a cam track of the apparatus (not shown, but conventional). A compression spring 53 urges the pusher rod 49 upwardly and thereby biases the locking arm to its open position illustrated in FIGS. 3 and 4.

Figure 5:
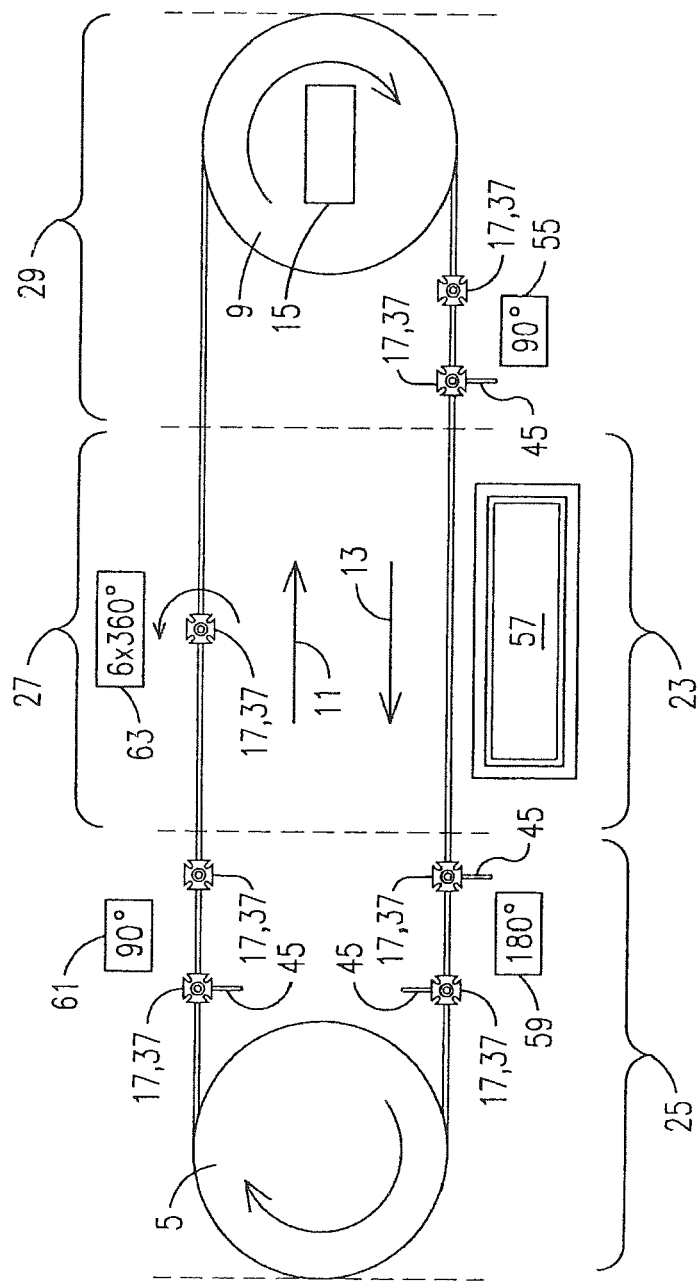
FIG. 5 is a schematic top plan view of the apparatus of FIGS. 1 and 2.

FIG. 5 schematically shows one example of the rotational movements of the bone holder along the processing or conveying path through the apparatus. The bone holders 17 are indicated by their turning gears 37, and only a few bone holders are shown at the locations about the conveying loop where their rotational positions or orientations may be changed according to the disclosure. In the actual apparatus there can be many more bone holders, but these are deleted in the schematic representation of FIG. 5 for clarity. Schematically indicated by numeral 55 is a first turning station, which readjusts the orientations of bone holders 17 returning from the second carousel 9 through 90° before the bone holders enter the loading section 23. This positions the receiving slots so that they face a loading platform 57, where an operator may manually insert fowl or poultry thighs into the bifurcated receiving ends 33 (FIG. 3) of the respective bone holders 17. The basic concept of a turning station, such as turning station 55, is conventional and well known in the art. To avoid unnecessary repetition, reference can be had to the disclosure of European patent 0,786,208 for a further description of such a turning station. Generally, such turning stations use a predetermined number of protrusions that engage one or more of the the diagonal slots at the corner points of the turning gear 37 of the bone holders 17. Each such engagement rotates the turning gear 37 by 90° so that the gear and attached items can be selectively rotated to a desired orientation.

Upon leaving the loading section 23, the bone holders 17 are turned through 180° by a further, second turning station 59. Thereby the receiving slots 33 (FIG. 3) are turned inwardly toward the interior of the conveyor path before encountering the first carousel 5, where these slots will be facing toward the axis of rotation of the first carousel. Upon leaving the first carousel 5 and before entering the second tissue cutting section 27, the bone holder 17 is again turned through 90° in a counter clockwise direction in this example by a third turning station 61. After this orientational adjustment, the receiving slot 33 (FIG. 3) is leading in or faces in the direction of movement (arrow 11). Then, as the bone holder 17 moves through cutting section 27 the bone holder 17 engages rotation station 63, in which its pinion gear 39 engages a toothed rack by which it is rotated through six full revolutions of 360°, while at the same time being advanced by the conveyer chain in the direction 11.

While at the loading section 23 (FIGS. 2 and 5), the bone holder 17, as mentioned above, is positioned to face with the open end of its receiving slot 33 toward the loading platform 57. In this position an animal thigh may be positioned by an operating person to be grasped by the bifurcated receiving end 31 (see FIG. 3) at the thigh bone shaft adjacent the hip knuckle (caput femoris). Preferably the animal thigh is also positioned with the front part of the knee knuckle facing the operator at the loading platform 57. Up to its transition past the first carousel 5, the swivelable locking arm 45 remains in its open position illustrated in FIG. 3. Upon leaving the first carousel 5, and in association with the third turning station 61, the locking arm 45 is moved into its locked position by urging the cam follower 51 downwardly against the compressing the bias of spring 53 (FIG. 3). This can be affected by an overhead cam track (not shown) positioned to engage and urge downwardly the cam follower 51. By this movement the pusher rod 49 will swivel the locking arm 45 via the intermediate pinion 47 into its locked position. The bone holder 17 will retain this locked configuration up to its transition through the second carousel 9, and will be allowed to open again by the cam track to release the thigh bone just prior to passing again the first turning station 55 during a successive cycle.

Brief reference will now be made to FIG. 6, which shows the first carousel that forms the first tissue cutting section 25 in a partial side elevation looking from the side of the apparatus 1 where the loading section 23 is located. For clarity, the cutting mechanisms have been deleted from FIG. 6. The first carousel 5 is rotatably suspended from the machine frame 19. The linear conveyer section 3 joins the first carousel 5 in a radial or tangential direction, so that each bone holder (not shown in FIG. 6) becomes associated with a relevant one of a plurality of pivotable knee end supports 65. The knee end supports 65 rotate with the first carousel 5 and are each provided with a guide roller 67 for controlling the pivotal position of the knee end support as will be explained in more detail below.

Figure 6:
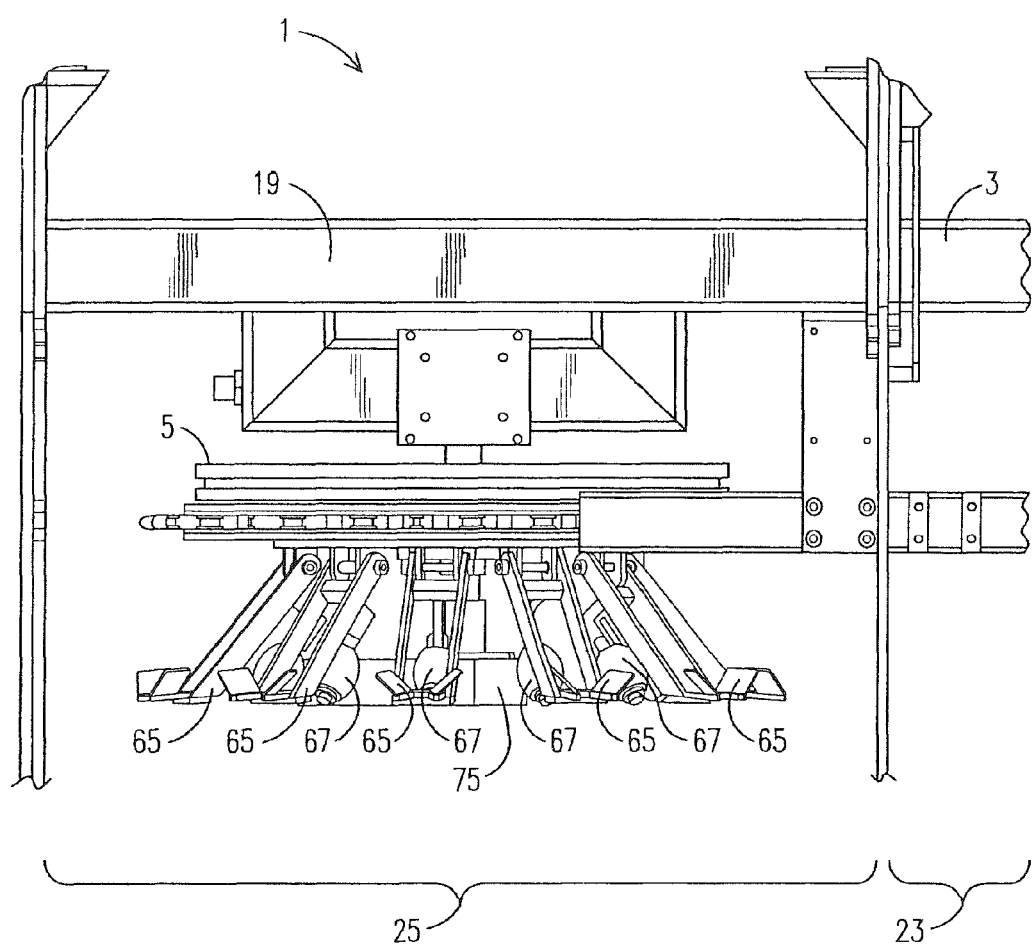
FIG. 6 is a partial side elevation of a first tissue cutting section of the apparatus of FIGS. 1 and 2.
Figure 7:
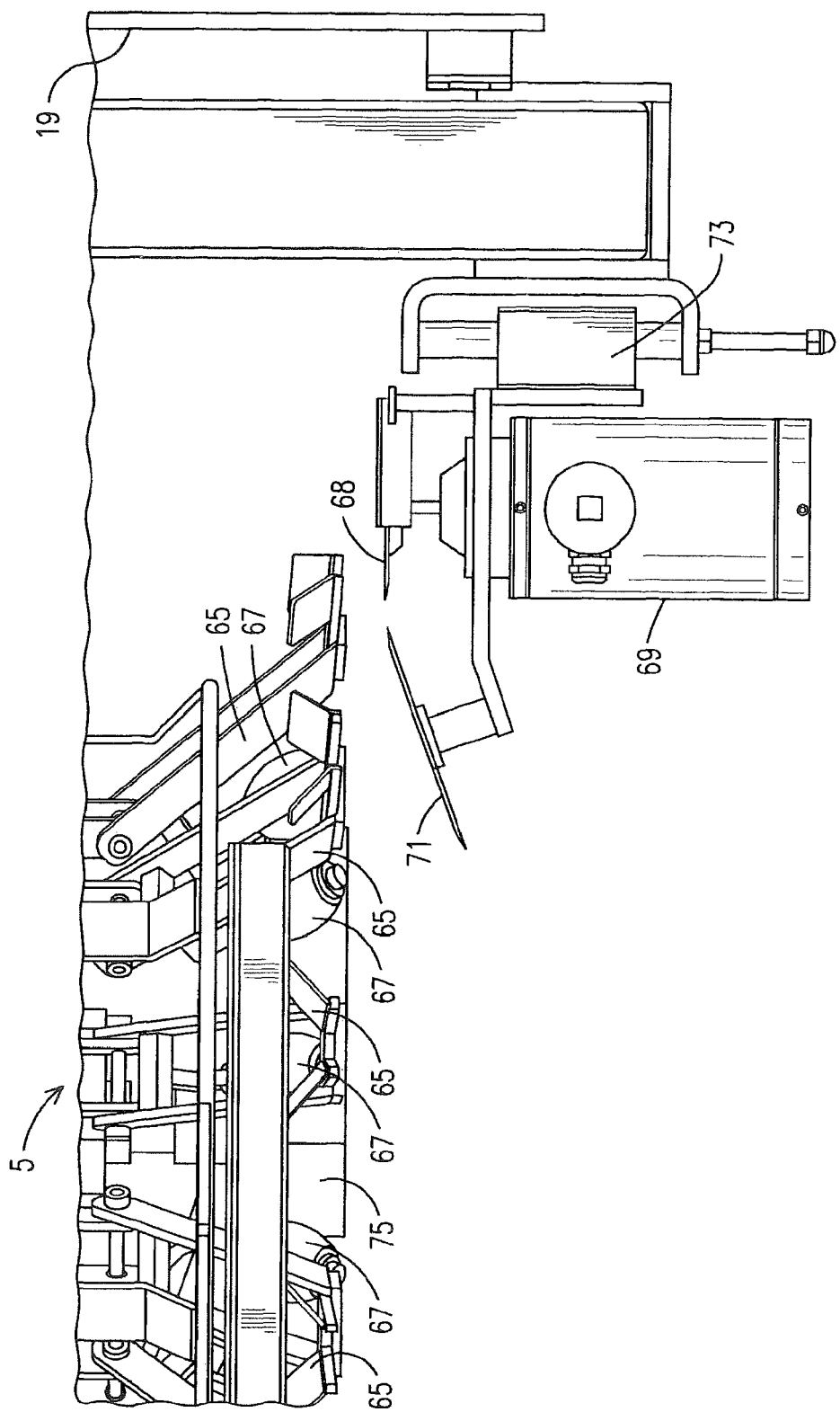
FIG. 7 is a detailed elevational view of the first tissue cutting section of FIG. 6 viewed from another perspective.

FIG. 7 is a partial view, opposite from the direction of FIG. 6, of a detail of the first carousel, but now showing the cutting mechanisms, comprising a circular rotating cutting blade 68 in position relative to the first carousel 5 and the knee end supports 65. Rotating cutting blade 68 is rotated by an electric motor unit 69. The rotating cutting blade 68 is confronted by a further circular cutting blade 71 that is mounted for idle rotation on, in this case, the electric motor unit 69. The entire electric motor unit 69 with its rotatable cutting blades 68, 71 is height adjustably mounted on the machine frame 19 by a screw adjustment device 73. The pivotable knee end supports 65 assists in positioning the individual knee ends of the animal thighs for passage between the opposed circular cutting blades 68, 71. The knee end supports 65, by moving the knees of the animal thighs radially outwardly with respect to the first carousel 5, also ensure, by spreading out the thighs, that there is sufficient spacing between successive knee portions, even when the thighs are suspended from a narrow pitch conveyor chain where the thighs are spaced closer together. A narrow pitch conveyor chain may be used to reduce the floor space required for the machine and/or to increase its throughput.

Figure 8:
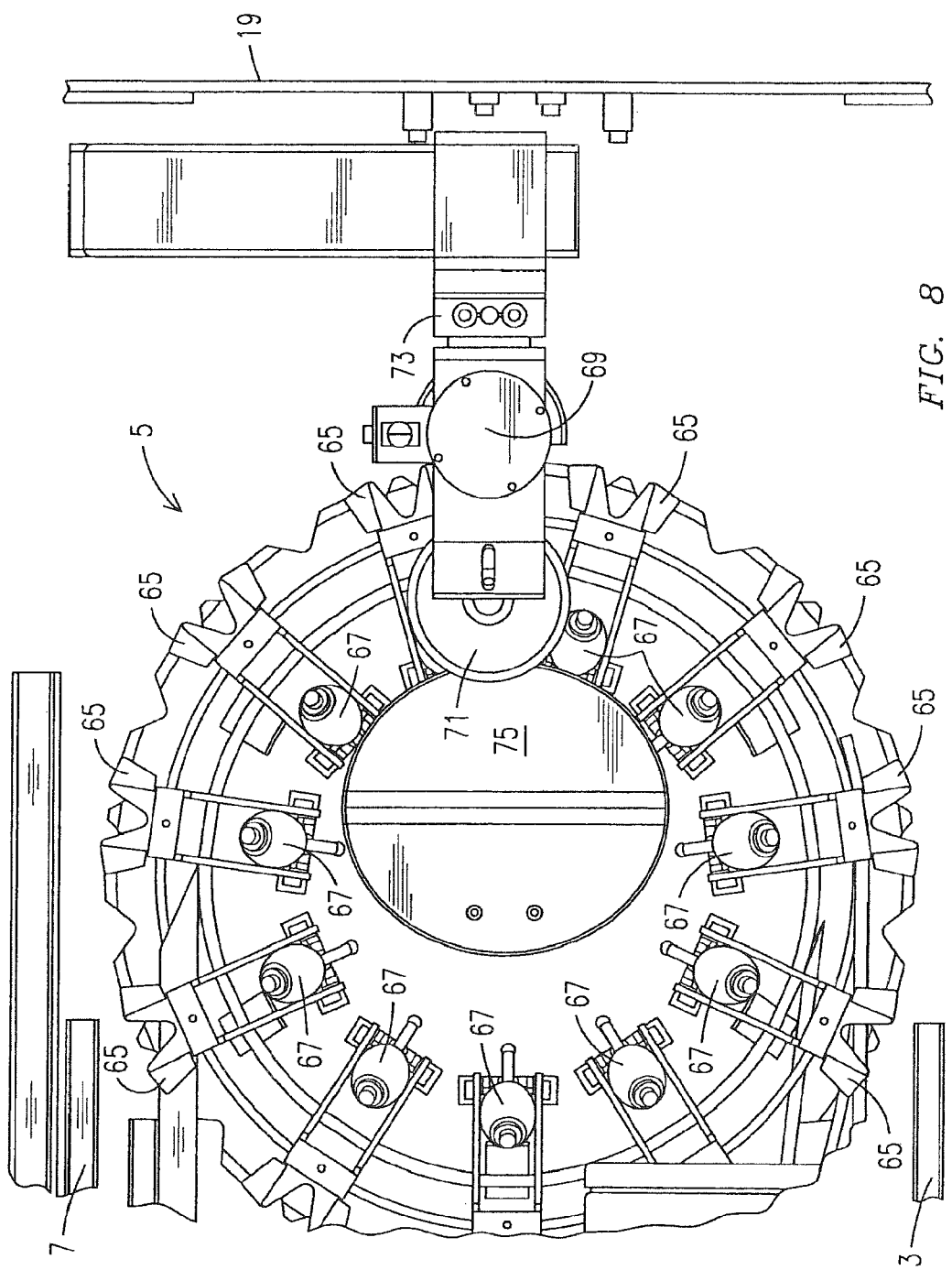
FIG. 8 is a bottom plan view of the cutting section of FIGS. 6 and 7.

In FIG. 8 an arrangement is shown for pivoting the individual knee supports 65 in respect of the cutting means. FIG. 8 is a view of the first carousel 5 as seen vertically upward from below. In this view it is possible to recognize a stationary excenter 75 that urges the guide rollers 67, and thereby the pivotable knee end supports, outwardly to a predetermined position with respect to the cutting blades 68, 71 on the motor unit 69. The predetermined position is such that the front and back portion of the bone shaft directly adjacent to the knee knuckle passes between the cutting blades 68, 71 for cutting tissue that connects the meat to the bone at that location. Thereby, such tissue is severed adjacent the front and back of the knee knuckle end of the thigh bone.

From the first carousel 5, the bone holders 17 advance along the overhead conveyor to the second linear section 7, after being turned by the third turning station 61 anticlockwise in this example through 90°. This turning movement positions each receiving slot 33 with its opening facing in the direction of conveyance. Further, as explained above, the locking arm 45 will now also have moved into its closed position in which it is engaged in the receiving slot 33 of the bifurcated receiving end 31. In this position and with the locking arm 45 closed, the bone holders 17 progress through the second tissue cutting section 27.

Figure 9:
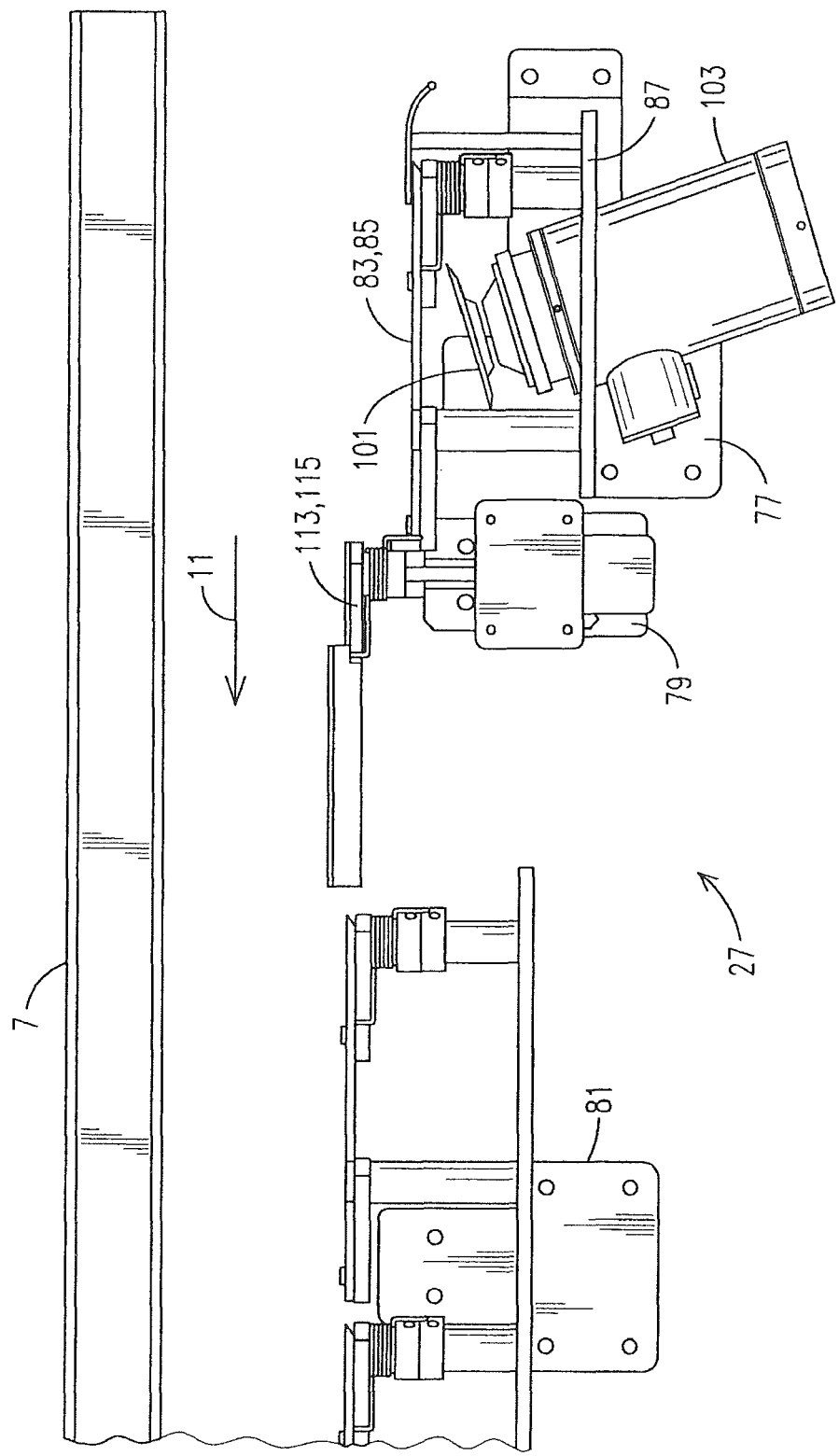
FIG. 9 is a partial side elevation of a second tissue cutting section of the apparatus of FIGS. 1 and 2.
Figure 10:
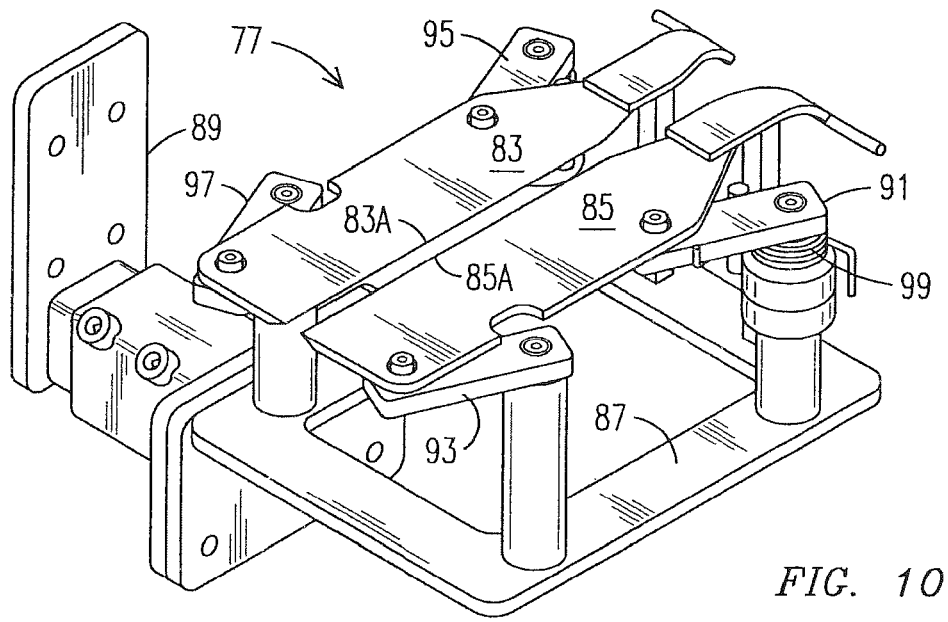
FIG. 10 is a perspective view of a first cutting station for use in the second tissue cutting section of FIG. 9.

A close-up detail of the second tissue cutting section 27 is shown in FIG. 9. For a description of the second tissue cutting section 27, reference can also be had again to FIG. 1. While progressing through the second tissue cutting section 27 in the direction of arrow 11, an animal thigh suspended from one of the bone holders 17 successively passes a first cutting station 77, a second cutting station 79 and a third cutting station 81. The first cutting station 77, as shown in more detail in FIG. 10, includes first and second parallel knife blades 83, 85. Each of the first and second knife blades 83, 85 is mounted on a supporting frame 87 that is mounted to the machine frame 19 by means of a mounting flange 89. The first and second knife blades 83, 85 are each pivotally linked to one of a first and second pair of substantially parallel pivoting arms 91, 93 and 95, 97 respectively. Of each pair of arms 91, 93, respectively 95, 97, at least a first one 91, 95 is provided with a torsion spring 99 that biases the knife edges 83A, 85A toward the centre of the path of conveyance, which passes between the knife edges.

The first cutting station 77 is positioned at a level with respect to the second linear conveyor section 7 to engage tissue adjacent the knee knuckle of an animal thigh passing between the opposite knife edges 83A, 85A. Because the animal thigh has been rotated through 90° as described, the knife edges 83A, 85A engage tissue that connects the meat to the bone at opposite side portions of the bone shaft adjacent the knee knuckle. This part of the tissue generally has not yet been severed by the first tissue cutting section 25.

It is further seen in FIG. 9 that the first cutting station 77 is also associated with a rotation cutting blade 101, driven by motor unit 103. The rotating cutting blade 101 is positioned below the parallel knife blades 83, 85 at a level to remove any excess matter below the knee knuckle, such as parts of the lower leg (tibiotarsus) that may have resulted from imperfections in previous poultry or fowl processing operations for obtaining the animal thighs. The frame 87 of the first cutting station 77 is provided with a large cut-out through which the rotating cutting blade 101 and part of the motor unit 103 may extend. Preferably height adjustment is additionally provided to fine tune the operation of the machine and the positions of the blades.

Figure 11:
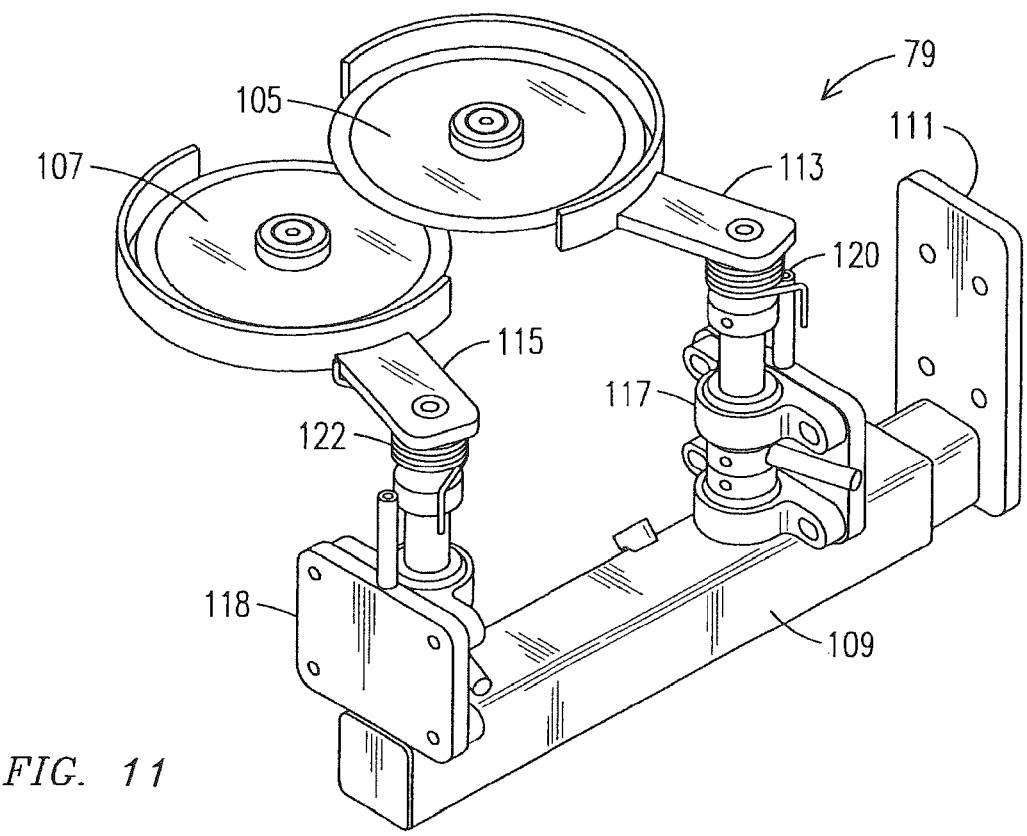
FIG. 11 is a second cutting station for use in the second tissue cutting section of FIG. 9.

In FIG. 11 the second cutting station 79 is shown in more detail. The second cutting 79 is positioned at a level with respect to the second linear conveyor section 7 to engage tissue near the hip knuckle of an animal thigh. To this end, the second cutting station 79 has opposite first and second rotatable knife blades 105, 107, which are not driven. The non-driven knife blades 105, 107 can be either stationary or idle to rotate upon engagement with animal tissue. However, when mounted for idle rotation, the rotation of the knife blades 105, 107 is preferably provided with a certain amount of drag, so as not to compromise the cutting action of the blade edges. The first and second rotatable knife blades 105, 107 are each pivotally mounted from a supporting frame 109 that has a mounting plate 111 for attachment to the machine frame 19. Both first and second rotary knife blades 105, 107 are biased and through the path of conveyance through which the animal thighs are advanced so that the blades overlap and interfere with the path of conveyance. Each of the first and second rotary knifes 105, 107 is mounted from a respective first or second swivel arm 113, 115, each carried on shafts rotatable in bearing blocks 117, 118. Biasing of the rotatable knife blades 105, 107 to overlap at the centre of the path of conveyance is obtained by respective first and second torsion springs 120, 122 that urge the arms 113, 115, and thus the blades, inwardly.

Figures 12, 14:
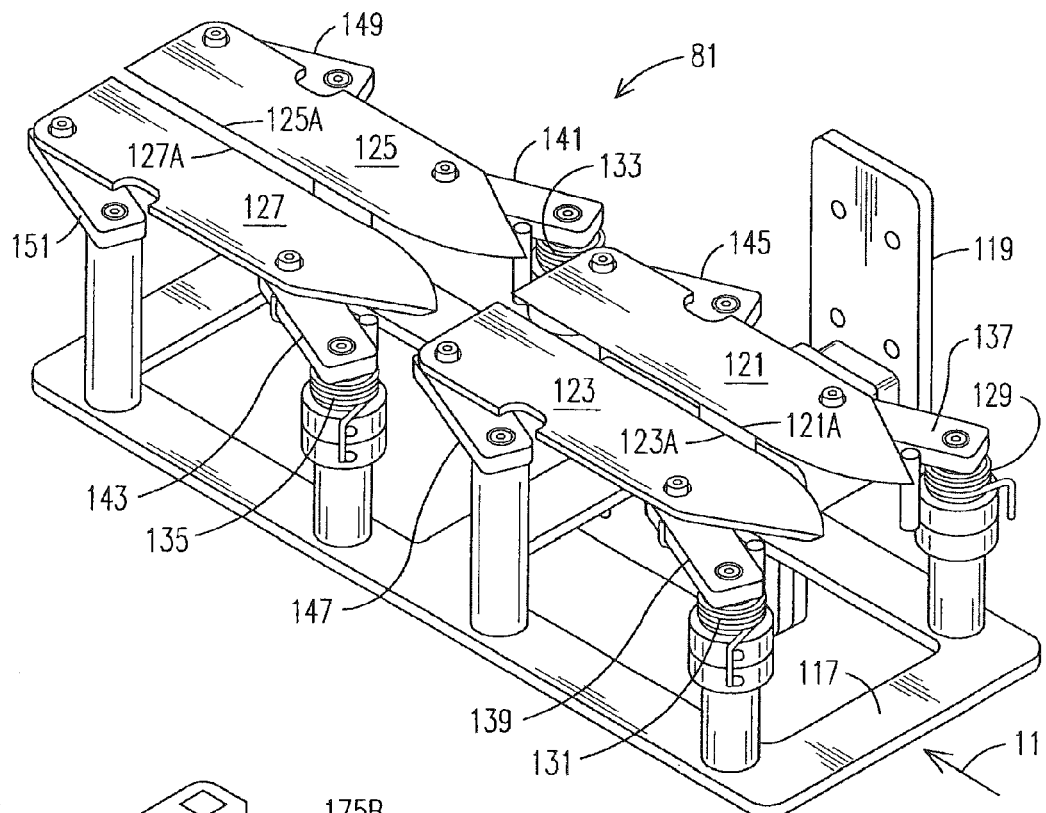
FIG. 12 is a third cutting station for use in the second tissue cutting section of FIG. 9.
FIG. 14 is a perspective view of a meat stripper unit for use in the meat stripping and discharge section of FIG. 13.

In FIG. 12 the third cutting station 81 is shown in more detail. The third cutting station 81 includes a supporting frame 117 cantilevered from a mounting plate 119 for attachment to the machine frame 19. Supported by the support frame 117 are a first pair of opposing knife blades 121, 123 and a second pair of opposing knife blades 125, 127. Confronting knife edges 121A, 123A and 125A, 127A of each first and second pair of opposing knife blades are biased towards the path of conveyance, which passes between the blades, by torsion springs 129, 131, 133, 135, acting on at least one of respective arms 137, 139, 141, 143 of the pairs of pivoting arms. The respective pairs each have a relevant further arm 145, 147, 149, 151 that is mounted for idle rotation about a vertically extending axis. With the arrangement of each knife blade being pivotally connected to a pair of substantially parallel pivoting arms, the knife blades each remain generally parallel to the path of conveyance, but still have some freedom to deviate from the parallel orientation when the hip bone of an animal thigh passes between the knife blades. The knife edges 121A, 123A, 125A, 127A of the first and second parts of opposing knife blades are positioned with respect to the second linear conveyer section 7 at a level to engage tissue near the hip knuckle that connects the meat of an animal thigh to the bone shaft.

When entering the first pair of opposing knife blades 121, 123 in the direction of the arrow 11, the animal thigh is rotated about an axis substantially coextensive with the longitudinal extent of the thigh bone shaft between its opposite end protuberances formed by the hip and knee knuckles. This rotation is induced by the bone holder 17 being rotated by rotation station 63 (FIG. 5), which includes a toothed rack engaging gear pinion 39 (not shown, but conventional). While passing through the first and second pairs of opposing knife edges 121A, 123A, 125A, 127A, juxtaposed in a downstream direction, the animal thigh is rotated through six full revolutions of 360° to ensure that all or substantially all tissue connecting the meat to the hip bone adjacent the hip knuckle is severed. It should be clear to the skilled artisan that other arrangements of the third cutting station are also possible. One such possibility is the use of only a single pair of opposing knife edges, which then would each have a longer length. Other variations may be sought in the number of revolutions through which the bone holder 17 is rotated while the bone is between the knife blades. Nonetheless, good results have been achieved with the example as described, especially in combination with a more compact narrow pitch conveyor system, using an eight inch, rather than the more common twelve inch pitch, between the suspended animal thighs.

Figure 13:
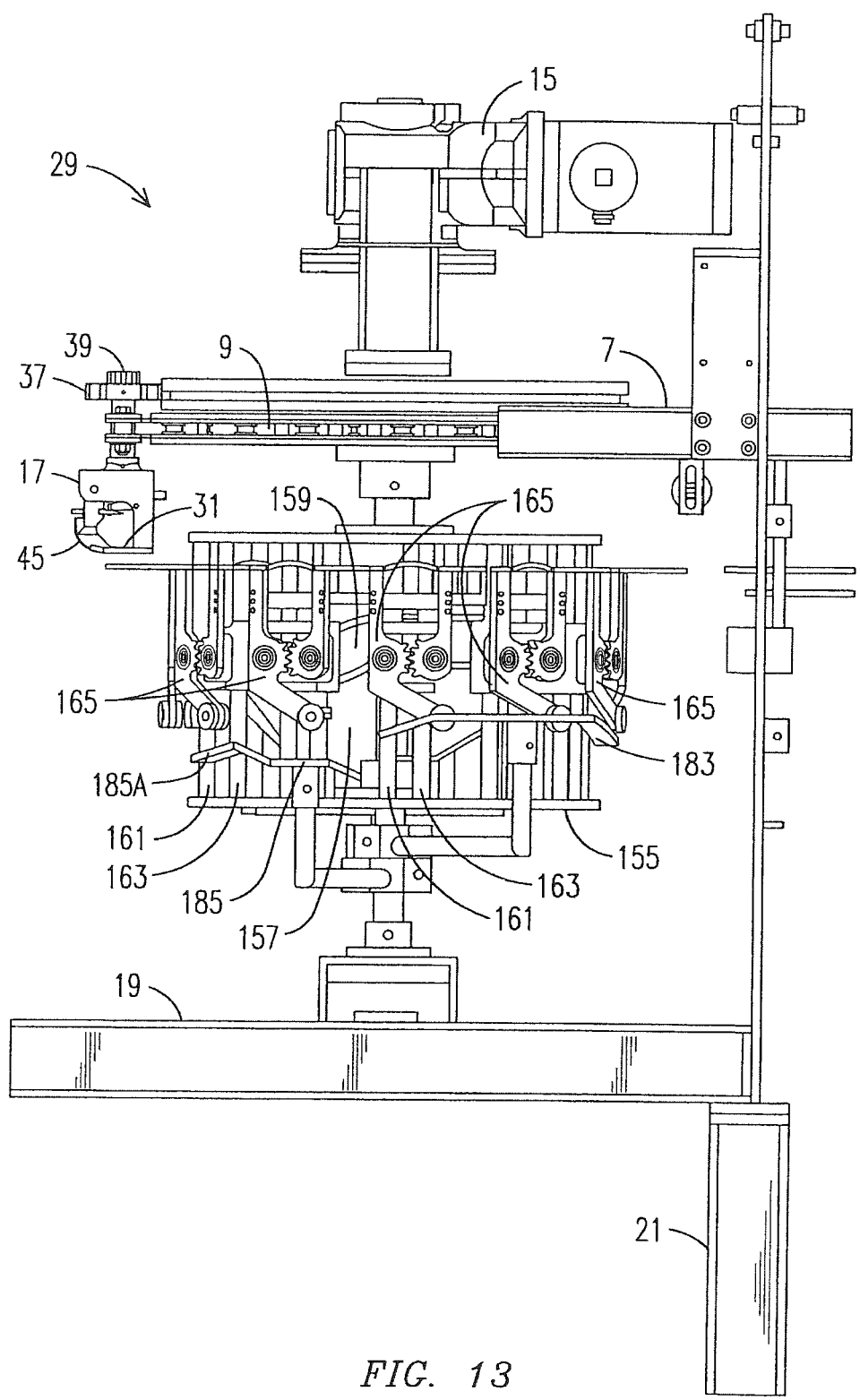
FIG. 13 is a partial side elevation of a meat stripping and discharge section of the apparatus of FIGS. 1 and 2.

In FIG. 13, a partial side elevation is shown of the meat stripping and discharge section 29 (FIG. 1). The meat stripping and discharge section 29 includes the second carousel 9 that receives the bone holders 17 from the second linear conveyer section 7 after these have been advanced through the second tissue cutting section 27. The second carousel 9 is driven by the electric drive motor 15 and rotates together with cage 155. The cage 155 can turn around a stationary cam drum 157 which is provided with a cam track 159. The rotating cage 155 includes a plurality of pairs of bars 161, 163 allowing vertical movement there along of meat stripper units 165. The meat stripper units 165 function to remove the meat from the bone, as detailed below.

The meat stripper units will now be further explained in reference to FIGS. 13 and 14. From FIG. 14 it will be apparent that the meat stripper unit 165 has a sliding block 167, with a pair of vertically extending bores 169 (only one of which is visible in FIG. 14), for accommodating the pair of bars 161, 163 of the rotating cage 155 in sliding relationship. At the rear of sliding block 167 there is provided a guide roller 171 that in use engages within the cam track 159 of the stationary cam drum 157. At the front of the sliding block 167 are positioned a first pivotable gripper arm 173 and a second gripper arm 175. The first and second gripper arms engage one another through gear toothed segments 173A, 175A and gripper plates 173B and 175B are disposed at the ends gripper arms 173 and 175 respectively. Accordingly, pivoting movement of the gripper arms 173, 175 and respective gripper plates 173B, 175B is synchronised to move away from the closed position shown in FIG. 14 by equal amounts relative to a center line. The gripper plates 173B, 175B are yieldably urged toward the closed position by a pull spring 177.

The second gripper arm 175 has an arm extension 179 that carries a cam follower wheel 181 at its distal end. The cam follower wheel 181 is positioned to engage perimeter cam track sections 183, 185 that extend about the rotating cage 155 as shown in FIG. 13. The cam track sections 183, 185 are stationary with respect to the rotating cage 155. A first one of the cam track sections 183 is positioned to urge the gripper plates 173B, 175B to the open position to engage a thigh hanging from an adjacent bone holder 17 at the thigh bone directly below the bifurcated end 31 of the bone holder 17. At a downstream end of the one cam track section 183, the cam track 159 of the stationary cam drum 157 moves the meat stripper unit 165, with the gripper plates 173B, 175B closed around the bone shaft, in a vertically downward direction, by means of the guide roller 171. During this downward movement and the meat stripper unit's progress in the second carousel, the other of the cam track sections 185 will engage the cam follower roller 181 with an upwardly directed hump 185A and thereby slightly open the gripper plates 173B, 175B to pass over the knee knuckle of the thigh bone.

Because the tissue holding the meat to the knuckle region of the thigh bone has already been severed sufficiently as described above, the continued downward movement of the meat stripper unit 165 substantially completely removes the meat from the thigh bone. This removed meat may then be collected by gravity in a collecting tray or alternatively by a collecting conveyer placed underneath the second carousel 9 of the meat stripper and discharge section 29. After removal of the meat, the bone holders 17 continue their movement around the second carousel 9 and the locking arm 45 is allowed to open again for release of the thigh bone from which the meat has been removed. Suitable means may additionally be provided to collect the discharged thigh bones, such as trays or conveyors.

Figure 15:
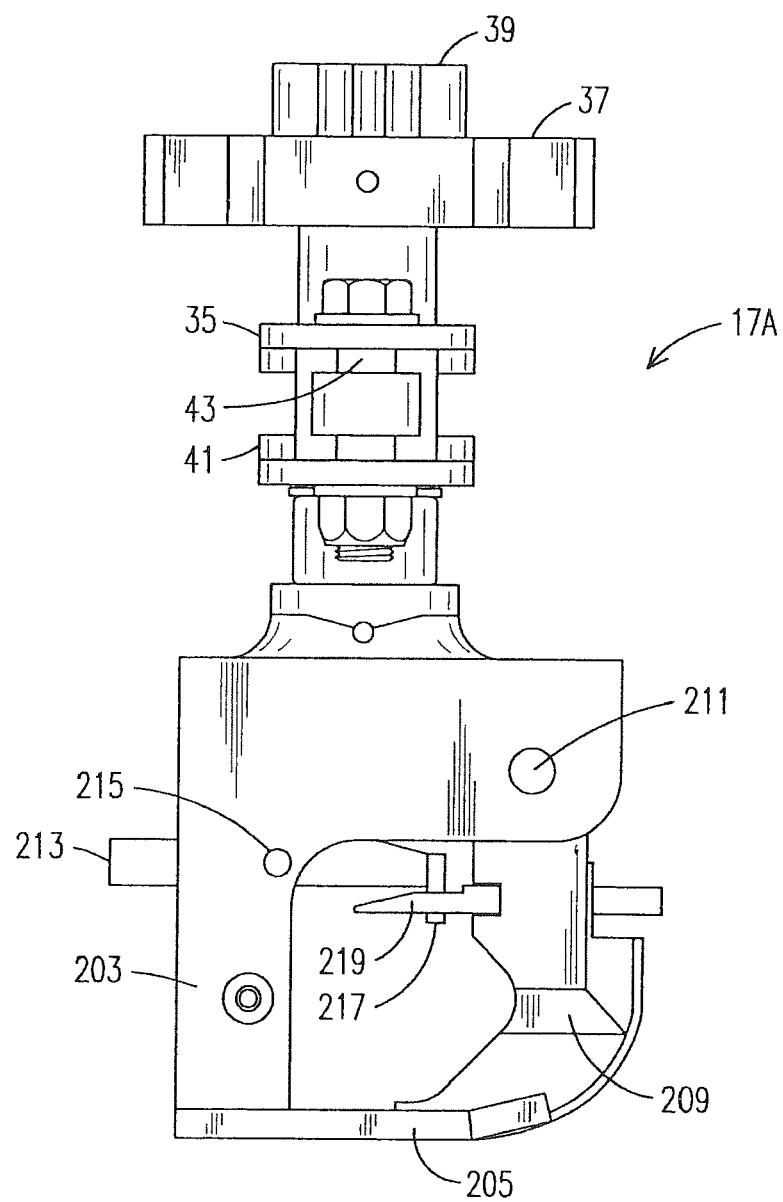
FIG. 15 is a side elevation of an alternative embodiment of a bone holder according to the disclosure.
Figure 16:
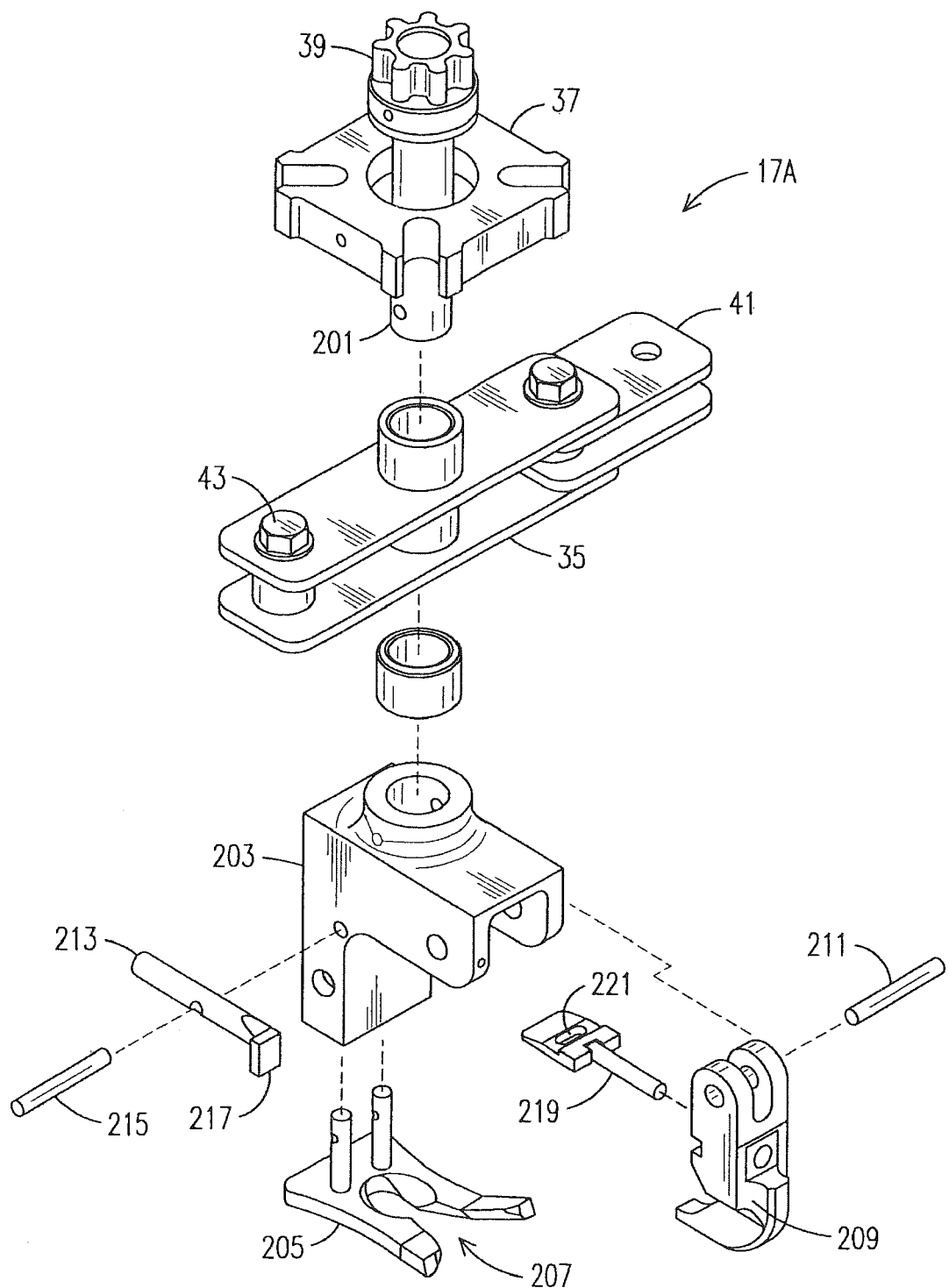
FIG. 16 is a perspective exploded view of the alternative embodiment of the bone holder of FIG. 15.

An alternative form of bone holder 17A is shown in FIG. 15 in side elevation, whereas FIG. 16 is a perspective exploded view of the same alternative form of bone holder. Because the upper portion of the bone holder 17A is largely similar to that described in reference to FIGS. 3 and 4, the same reference numerals have been used to denote the bone holder shackle 35, the turning gear 37, the gear pinion 39, the intermediate shackle 41, and the connecting bolts 43.

Depending from a pinion shaft 201, which extends through the bone holder shackle 35, is a receiving block 203, to which is mounted a bifurcated receiving end 205. The bifurcated receiving end 205 has a receiving slot 207, for receiving the hip joint protrusion of an animal thigh hip bone (femur). Pivotally mounted to the receiving block 203 is a swivelable locking arm 209 that pivots about a first pivot pin 211. The swivelable locking arm 209 is biased to an open position by a torsion spring (not shown, but conventional). In FIG. 15 the swivelable locking arm 209 is shown in its closed position, which closed position is held by a pivotable latch arm 213 mounted from a second pivot pin 215. The latch arm 213 has a downwardly extending detent 217 that in FIG. 15 is shown engaging an aperture 221 in a latch gripper 219. The latch gripper 219 can be adjustably attached to the locking arm 209, thereby to determine the position of closure of the locking arm 209 and take into account variations in bone shaft thicknesses.

Closing of the locking arm 209 is affected by a cam track means (not shown, but conventional) acting directly on the locking arm, upon passing and engaging the cam track means. In contrast to the bone holder of FIGS. 3 and 4, the bone holder 17A of FIGS. 15 and 16 locks itself in the closed position, so that it is not necessary to keep it engaged by a cam track for as long as the locking arm 209 needs to be closed. Conversely only a further short cam track or camming mechanism is needed to unlatch the locking arm 209 to cause the latch arm 213 to lift the detent 217 from the latch gripper 219 and thereby allow the locking arm 209 to swivel to its open position to which it is normally biased. The latch arm can be actuated by a cam track that is positioned to depress the exposed end of the latch arm 213 and cause it to pivot about the second pivot pin 215. This arrangement has the benefit of reducing friction and wear in the operation of the apparatus, by avoiding cam track followers (such as 51 of bone holder 17), to be in prolonged engagement with a cam track. The modified bone holder 17A, also results in a reduction of raw materials, such as stainless steel, necessary in the construction of a deboning apparatus.

Accordingly a method of mechanically deboning animal thighs for separating and collecting meat therefrom is disclosed, as well as an apparatus for performing this method, that includes automated individual processing steps. The processing steps include grasping a thigh bone of an animal thigh at a hip knuckle with a bone holder; cutting tissue near the hip knuckle; and engaging the thigh bone adjacent the hip knuckle with a meat stripper. Further the processing steps include moving the bone holder and meat stripper away from one another in a direction substantially coextensive with the longitudinal extent of the thigh bone; allowing the meat stripper to pass over the knee knuckle; and collecting the meat separated from the bone. In particular the method includes and the apparatus performs the process step of cutting tissue adjacent a knee knuckle of the thigh bone prior to allowing the meat stripper to pass over the knee knuckle. The apparatus includes a plurality of processing stations for carrying out the individual steps, and the processing stations are arranged along a path of conveyance defined by a conveyor chain moving through a predefined path that is defined by a first linear conveyor section, a first carousel (5), a second linear conveyor section (7), and a second carousel (9).

It is thus believed that the operation and construction of the present invention will be apparent from the foregoing description. To the skilled person in this field of the art it will be clear that the invention is not limited to the embodiment represented and described here, but that within the framework of the appended claims a large number of variants are possible. Also kinematic inversions are considered inherently disclosed and are considered to be within the scope of the present invention. The terms comprising and including when used in this description or the appended claims should not be construed in an exclusive or exhaustive sense but rather in an inclusive sense. While the invention has been illustrated within the context of preferred embodiments and methodologies considered by the inventors to represent the best mode of carrying out the invention, it will be clear that a wide variety of additions, deletions, and modifications, both subtle and gross, might be made to the illustrated embodiments without departing from the spirit and scope of the invention delineated by the claims. Features that are not specifically or explicitly described or claimed may be additionally included in the structure according to the present invention without deviating from its scope.

The invention claimed is:

1. A method of deboning animal thighs for separating and collecting meat therefrom, the animal thighs having meat and tissue surrounding a thigh bone with a hip knuckle at one end and a knee knuckle at an opposite end, the method comprising the automated individual processing steps of:
   receiving a thigh bone of an animal thigh at a hip knuckle within a receiving slot of a bone holder with the knee knuckle hanging substantially vertically downward below the receiving slot;
   blocking the receiving slot to prevent a thigh bone suspended in the receiving slot from escaping;
   cutting at least a portion of the meat and tissue near the hip knuckle with a knife;
   engaging the thigh bone adjacent the receiving slot of the bone holder with a meat stripper;
   moving the bone holder and meat stripper away from one another in a direction substantially coextensive with the longitudinal extent of the thigh bone to strip meat and tissue from the thigh bone in a direction toward the knee knuckle;
   allowing the meat stripper to pass at least partially over the knee knuckle as the meat and tissue is stripped from the thigh bone;
   cutting meat and tissue adjacent the knee knuckle of the thigh bone to release the meat and tissue from the thigh bone; and
   collecting the meat released from the thigh bone.

2. A method according to claim 1, wherein the step of cutting meat and tissue adjacent the knee knuckle of the thigh bone further includes supporting and moving a portion of the thigh bone adjacent the knee knuckle and contacting the meat and tissue adjacent the knee knuckle with a cutting blade.

3. A method according to claim 2, wherein the cutting blade comprises a rotating cutting blade.

4. A method according to claim 1, wherein the step of cutting meat and tissue adjacent the knee knuckle of the thigh bone precedes the step of moving the bone holder and meat stripper away from one another.

5. A method according to claim 1, wherein the step of cutting tissue adjacent the knee knuckle of the thigh bone also includes keeping a portion of the thigh bone adjacent the knee knuckle in engagement with a knife blade, while advancing the animal thigh through a path of travel defined by the individual processing steps.

6. A method according to claim 5, wherein the keeping of the portion of the thigh bone adjacent the knee knuckle in engagement with a knife blade comprises cutting the knee knuckle related tissue that connects the meat to the bone at a side portion of the bone shaft adjacent the knee knuckle perpendicular to the tissue.

7. A method according to claim 6, wherein the cutting steps include cutting from opposite sides of the bone shaft adjacent the knee knuckle.

8. A method according to one of claim 1, further comprising advancing the animal thigh along a processing path while performing the individual processing steps.

9. A method according to one of claim 1, wherein the step of cutting tissue near the hip knuckle includes rotating the bone holder about an axis substantially coextensive with a longitudinal extent of the thigh bone, while keeping a portion of the thigh bone adjacent the hip knuckle in engagement with a knife edge.

10. A method according to claim 9, wherein the step of cutting tissue near the hip knuckle includes passing the portion of the hip bone adjacent to the hip knuckle between oppositely disposed knife edges that are biased towards one another.

11. A method according to one of claim 1, further comprising collecting meat for further processing after the meat stripper has passed at least partially over the knee knuckle.

12. A method according to claim 11, further comprising unblocking the receiving slot and releasing the thigh bone after collecting the meat.

13. A method according to claim 1, wherein the steps are performed while conveying the animal thighs along a conveying path that extends through a closed loop.

14. A method of removing meat from a poultry thigh having meat surrounding an elongated thigh bone with a hip knuckle at one end of the thigh bone and a knee knuckle at an opposite end of the thigh bone, the method comprising the steps of:

moving a bone holder along a path of conveyance, the bone holder having a receiving slot with a width greater than the size of the thigh bone and less than the size of the hip knuckle;

receiving the thigh bone of the poultry thigh within the slot of the bone holder with the hip knuckle of the thigh bone disposed above the slot and with the thigh bone suspended downwardly from the slot to the knee knuckle, the suspended thigh bone being moved along the path of conveyance with the bone holder;

engaging the poultry thigh adjacent the hip knuckle with a knife to cut tissue attaching the meat to the bone at the hip knuckle;

preventing the thigh bone from escaping from the slot as the bone holder and thigh bone suspended therefrom are conveyed progressively along the path of conveyance;

engaging the thigh below the slot of the bone holder with a meat stripper that at least partially surrounds the thigh bone;

moving the bone holder and meat stripper away from one another in a direction substantially coextensive with the thigh bone to strip meat from the thigh bone in a direction toward the knee knuckle;

passing the meat stripper at least partially over the knee knuckle;

engaging the meat adjacent the knee knuckle with a knife to cut the meat and release the meat from the thigh bone;

collecting the meat;

allowing the thigh bone to escape from the slot; and collecting the thigh bone separately from the meat.

15. A method of removing meat from a poultry thigh as claimed in claim 14 wherein the step of preventing the thigh bone from escaping from the slot comprises blocking the slot.

16. A method of removing meat from a poultry thigh as claimed in claim 15 wherein the step of blocking the slot comprises moving a locking arm into the slot after the thigh is received in the slot.

17. A method of removing meat from a poultry thigh as claimed in claim 14 wherein the step of engaging the poultry thigh adjacent the hip knuckle with a knife comprises engaging the poultry thigh with a rotating knife.

18. A method of removing meat from a poultry thigh as claimed in claim 17 wherein the rotating knife is a disc-shaped knife.

19. A method of removing meat from a poultry thigh as claimed in claim 14 wherein the step of passing the meat stripper at least partially over the knee knuckle precedes the step of engaging the meat adjacent the knee knuckle with a knife.

20. A method of removing meat from a poultry thigh as claimed in claim 14 wherein the step of collecting the meat follows the step of engaging the meat adjacent the knee knuckle with a knife.

21. A method of removing meat from a poultry thigh as claimed in claim 14 wherein the step of engaging the poultry thigh adjacent the hip knuckle with a knife precedes the step of engaging the meat adjacent the knee knuckle with a knife.

22. A method of removing meat from a poultry thigh as claimed in claim 14 further comprising the step of engaging the thigh with a guide rail to position the thigh prior to the step of engaging the poultry thigh adjacent the hip knuckle with a knife.

23. A method of removing meat from a poultry thigh as claimed in claim 14 wherein the step of engaging the meat adjacent the knee knuckle with a knife comprises successively engaging the meat adjacent the knee knuckle with two or more knives.

* * * * *